United States Patent
Sokolov et al.

(10) Patent No.: US 10,339,340 B1
(45) Date of Patent: Jul. 2, 2019

(54) ANONYMOUS REPUTATION REQUESTS

(71) Applicant: Symantec Corporation, Mountain View, CA (US)

(72) Inventors: Ilya Sokolov, Boston, MA (US); Ronald A. Frederick, Mountain View, CA (US); Mark Kennedy, Gardena, CA (US)

(73) Assignee: Symantec Corporation, Mountain View, CA (US)

( * ) Notice: Subject to any disclaimer, the term of this patent is extended or adjusted under 35 U.S.C. 154(b) by 127 days.

(21) Appl. No.: 15/633,408

(22) Filed: Jun. 26, 2017

(51) Int. Cl.
*G06F 21/62* (2013.01)
*H04L 29/06* (2006.01)

(52) U.S. Cl.
CPC ...... *G06F 21/6245* (2013.01); *H04L 63/0421* (2013.01)

(58) Field of Classification Search
CPC .................. G06F 21/6245; H04L 63/0421
See application file for complete search history.

(56) References Cited

PUBLICATIONS

Gerbet et al., (A Privacy Analysis of Google and Yandex Safe Browsing, RR-8686, INRIA. 2015, 28 pages) (Year: 2015).*
Eddy, Max. "How to Hide Your IP Address." PC Magazine, Apr. 13, 2016, http://www.pcmag.com/article/343394/how-to-hide-your-ip-address. Accessed Jun. 26, 2017.

* cited by examiner

*Primary Examiner* — Oleg Korsak
(74) *Attorney, Agent, or Firm* — Holland & Hart LLP (57) ABSTRACT

A method for anonymous reputation requests is described. In one embodiment, the method includes calculating a full thumbprint of an object on a client machine, trimming one or more bits from the full thumbprint to generate a trimmed thumbprint, sending the trimmed thumbprint to a reputation server, and receiving a result from the reputation server regarding the trimmed thumbprint.

20 Claims, 7 Drawing Sheets

ANONYMOUS REPUTATION REQUESTS

BACKGROUND

The use of computer systems and computer-related technologies continues to increase at a rapid pace. This increased use of computer systems has influenced the advances made to computer-related technologies. Computer systems have increasingly become an integral part of the business world and the activities of individual consumers. Computer systems may be used to carry out several business, industry, and academic endeavors.

As technology in the home, work place, and public areas continues to develop, the ability to secure and protect user information has become more difficult. Thus, there exists a need in the art to develop systems and methods for improving customer privacy in computer security.

SUMMARY

According to at least one embodiment, a method to improve customer privacy in computer security is described. In one embodiment, the method may include calculating a full thumbprint of an object on a client machine, trimming one or more bits from the full thumbprint to generate a trimmed thumbprint, sending the trimmed thumbprint to a reputation server, and receiving a result from the reputation server regarding the trimmed thumbprint. In some cases, the trimming of one or more bits may further include at least one of trimming one or more least significant bits off the full thumbprint, trimming one or more most significant bits off the full thumbprint, trimming one or more middle segment bits off the full thumbprint, and performing integer division with fractions dropped on the full thumbprint, or any combination thereof. In some cases, the object may include at least one of a file on the client machine, a file address of the file, and a uniform resource locator (URL) entered in a web browser of the client machine, or any combination thereof. In one embodiment, calculating the full thumbprint may include using a hash function to generate a hash value of the object.

In some embodiments, the method may include estimating, based at least in part on a total number of server thumbprints on the reputation server and a distribution of the server thumbprints, how many matches the reputation server returns when a certain number of bits are trimmed from the full thumbprint. In some cases, the method may further include trimming N bits from the full thumbprint to enable the reputation server to return approximately M matches to the full thumbprint.

In some embodiments, the method may further include generating a fake trimmed thumbprint and sending the fake trimmed thumbprint to the reputation server to obfuscate the sending of the trimmed thumbprint to the reputation server. In some cases, the reputation server may compare the trimmed thumbprint to one or more server thumbprints on the reputation server, identify each server thumbprint of which a portion of each server thumbprint matches at least a portion of the trimmed thumbprint, and transmits to the client machine an indication of each server thumbprint that matches at least a portion of the trimmed thumbprint.

In some embodiments, the result from the reputation server may indicate at least one of information regarding metadata associated with the object, one or more categories associated with content of the object, one or more attributes of the object, an indication of encryption strength and/or encryption type associated with the object, an indication of whether the object complies with one or more given standards, a threat risk score associated with the object, information regarding a malware infection of the object, that when the full thumbprint matches a first server thumbprint the object is safe for the client machine, and when the full thumbprint matches a second server thumbprint the object is not safe for the client machine, or any combination thereof.

In some cases, the method may include receiving, in the result from the reputation server, a request from the reputation server for additional information regarding the object when no server thumbprint matches the trimmed thumbprint.

A computing device for improving computer privacy in computer security is also described. The computing device may include one or more processors and memory in electronic communication with the one or more processors. The memory may store computer executable instructions that when executed by the one or more processors cause the one or more processors to perform the steps of calculating a full thumbprint of an object on a client machine, trimming one or more bits from the full thumbprint to generate a trimmed thumbprint, sending the trimmed thumbprint to a reputation server, and receiving a result from the reputation server regarding the trimmed thumbprint. In some cases, when the processor trims one or more of the bits, the instructions may be configured to trim at least one of one or more least significant bits off the full thumbprint, trim one or more most significant bits off the full thumbprint, trim one or more middle segment bits off the full thumbprint, and perform integer division with fractions dropped on the full thumbprint, or any combination thereof. In some cases, the object includes at least one of a file on the client machine, metadata of the file, a file address of the file, and a uniform resource locator (URL) entered in a web browser of the client machine, or any combination thereof.

In some cases, the file name of the file may be associated with the full pathname of where the file is stored on the computing device. If the file is retrieved via the Internet, the file name of the file may be synonymous with a URL, where the URL is used to retrieve the specific file. Regardless of what the file name is associated with, a hash of the file's content may be used as a way to determine the reputation or other attributes of the file.

In some embodiments, when the processor calculates the full thumbprint, the instructions may further cause the processor to calculate the full thumbprint using a hash function to generate a hash value of the object. In some cases, the instructions are further executable to cause the one or more processors to further perform the step of estimating, based at least in part on a total number of server thumbprints on the reputation server and a distribution of the server thumbprints, how many matches the reputation server is likely to return when a certain number of bits are trimmed from the full thumbprint. In some cases, the instructions are further executable to cause the one or more processors to further perform the step of trimming N bits from the full thumbprint to enable the reputation server to return approximately M matches to the full thumbprint. In some cases, the instructions are further executable to cause the one or more processors to further perform the step of generating a fake trimmed thumbprint and sending the fake trimmed thumbprint to the reputation server to obfuscate the sending of the trimmed thumbprint to the reputation server.

In some embodiments, the instructions are further executable to cause the one or more processors to further perform the steps of comparing the trimmed thumbprint to one or more server thumbprints on the reputation server, identify each server thumbprint of which a portion of each server thumbprint matches the trimmed thumbprint, and transmit to the client machine an indication of each server thumbprint that matches at least a portion of the trimmed thumbprint.

In some embodiments, a non-transitory computer-readable storage medium storing computer executable instructions that when executed by one or more processors may cause the one or more processors to perform the steps of calculating a full thumbprint of an object on a client machine, trimming one or more bits from the full thumbprint to generate a trimmed thumbprint, sending the trimmed thumbprint to a reputation server, and receiving a result from the reputation server regarding the trimmed thumbprint.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to anonymous reputation requests. More specifically, the systems and methods described herein relate to an anonymizing function for submitting thumbprint values to a reputation backend.

In some cases, data communications may be vulnerable to man-in-the-middle (MITM) attacks that impersonate valid connections with a device, gather and/or receive information relating to the device, and engage in harmful, hostile behavior to steal information. One example of these attacks is obtaining, by a third party, information being transmitted in file reputation requests. Users of technology may be unaware of these attacks and as a result may unknowingly divulge sensitive information to those breaching the system.

Every day, users are faced with digital dangers and malicious software. Consumer reports show that on average, consumers are faced with an exponentially increasing number of online data security risks. The industry currently has solutions that protect users against online dangers on the client, such as malware and anti-virus software protection. However, current security software applications may side-channel a considerable amount of sensitive data to a remote location. For example, file reputation requests may disclose information regarding applications and/or files installed on the client. In some cases, a malicious third party may intercept such messages and use this information for potential attack vectors to exploit. Also, web reputation queries may transmit, or otherwise make available, political preferences, religious preferences, and other user preference (e.g., in some cases by identifying sites the user is visiting). Any log of such requests may be subject to local laws (e.g., European Union requires any database containing a user's private information to reside within EU borders).

Placing reputation databases on clients is not an effective option to protect such data due to reputation database size and demand on client resources. Therefore, reputation queries have to made over the Internet. Instead of using an actual file hash (e.g. MD5 hash algorithm or SHA2 algorithm) or an actual domain name value, the current methods and systems apply anonymizing functions before submitting a thumbprint to the reputation backend. Examples of anonymizing functions may include trimming bits and random range:

Trimming Bits: Trimming bits may include trimming a number bits off of the thumbprint either of an object such as a file or a portion of a uniform resource locator (URL). In some cases, trimming bits may include using integer division (in some cases with the fractions dropped) to remove a certain portion of bits from the thumbprint. In some cases, trimming bits may include creating fuzzy hashes that define a static range of possible thumbprints, where one of the thumbprints in the range is associated with the thumbprint of the object. Instead of returning concrete reputation results, the server (not knowing which file or URL the client is asking about) may return reputation information for all files or URLs with thumbprints fitting the range to one degree or another.

In some cases, a client may select hash ranges for various conditions. Knowing a total number of server thumbprints in a reputation database, and given the cryptographically strong random distribution of the server thumbprints, a client may approximate how many reputation results to receive from the reputation server based on the number of bits trimmed and/or the base selected for integer division. Thus, a client may select a certain number of bits to trim in order to receive an approximate number of reputation results. In one example, the client may calculate a hash range in such a way that the server returns approximately M reputation results, where M is a positive integer. In some cases, the value of M may be adjusted based on the number of reputation requests desired (e.g., M may be lesser for an initial scan and greater for checking the reputation of a download, etc.).

Random Range: In some cases, ranges of reputation results may be selected randomly by the client, with the target thumbprint occurring somewhere within the range of reputation results. As one example, full thumbprints may be generated for two or more objects. For instance, a full thumbprint may be generated for a first object, and a full thumbprint may be generated for at least a second object. Also, in one example, the client may generate trimmed thumbprints for at least the full thumbprints of the first and second objects. In this example, the first object may be an unknown or uncategorized object that is potentially harmful to the client, while the second object may be a known or categorized object known to be harmless to the client or known to be clean from malware, although whether the object is or is not categorized a certain way may or may not be known to the client at any point in time. In this example, the client may send the trimmed thumbprint of the second object as a fake request. Thus, in this example, the client may send the trimmed thumbprints from at least both the first and second objects in order to receive reputation information on the first object.

In one example, the user may navigate to the following URL: "https://www.xyz.com/abc/def." The system may extract a portion the URL (e.g., "xyz.com"), include or excluding one or more portions of the URL (e.g., "xyz.com/abc") and generate a trimmed thumbprint based on the selected portion (e.g., "0a5d06da3efc82069ceb33a3b0463-fd"), and send the trimmed thumbprint to the reputation server. In response, the reputation server may reply: "if the full (i.e., non-trimmed) thumbprint calculated locally by the client matches the following value: "0a5d06da3efc82069-ceb33a3b0463fd7ee55b31e4b014b952e52fd9999999999," then the file is safe (e.g., no malware). Alternatively, the reputation server may reply "if the full (i.e., non-trimmed) thumbprint calculated locally matches "0a5d06da3efc820-69ceb33a3b0463fd7ee55b31e4b014b952e52fdf209656a-b8" (e.g., SHA2("xyz.com")), then beware of "/abc" (or SHA2("/abc"))." Alternatively, one or more trimmed thumbprints may be included for the same URL in a single reputation request. For example, the URL "https://www.xyz.com/abc/def" may be split into two or more segments, which may overlap, such as: "www.xyz.com," "xyz.com," "xyz.com/abc," and the like. Accordingly, the reputation server may return information on "www.xyz.com," "www.xyz.com," "xyz.com," and "xyz.com/abc," etc. In some examples, the reputation server may return results for the trimmed thumbprints which may correspond to each or all of the different example variations of the URL described above and not simply the URL itself; the reputation server may never see the actual URL; rather, the reputation server may have knowledge only of the trimmed thumbprints corresponding to the URL.

In some embodiments, the methods and systems described herein may be used on the client such as to pass trimmed and "fuzzed" file thumbprints to the backend in order to retrieve reputation results. In some cases, the methods and systems described herein may be used at the backend. For example, hash ranges of unknown files from client systems from be stored in a database on the backend. In some cases, the backend may keep the stored hash ranges to determine if newly detected malware matches any of the stored ranges. In some cases, the backend may issue notifications to the client system when new malware is detected that matches any of the ranges. In one example, the notification may suggest performing a rescan to detect the newly identified malware.

In some embodiments, the client may issue a fake reputation request or query that contains random thumbprint ranges and/or thumbprints of previously categorized files. For example, the reputation request may include thumbprints of files known to have vulnerabilities (e.g., vulnerable versions of OpenSSH). Subsequently, the system may monitor if there are any attempts to exploit the vulnerable files. For instance, an administrator may configure a reputation honeypot to detect such attempts.

In some cases, reputation requests or queries may be used for crowdsourcing security telemetry. To preserve the capability, the client may resubmit the untrimmed thumbprint. Additionally or alternatively, the client may sample the file body or content or webpage content. In some cases (e.g., when the file and/or domain is not known to the back end), user permission may be given (and/or a local security policy).

Accordingly, the methods and systems described herein may be used independently or in combination with other approaches to preserve client anonymity (e.g., for anonymous accounts, virtual private networks (VPNs) to hide source IP, etc.).

Figure 1:
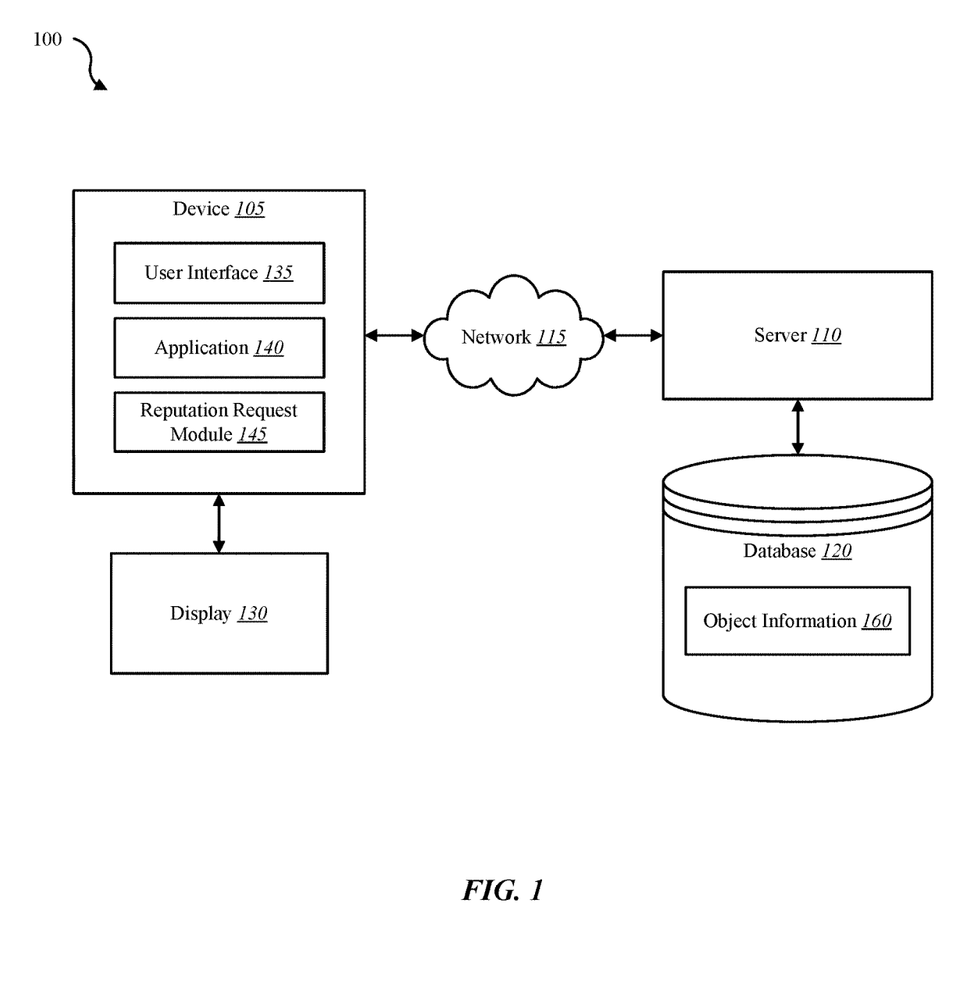
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed on a device (e.g., device 105). In other embodiments, the systems and methods described herein may be performed on a server (e.g., server 110). As depicted, the environment 100 may include a device 105, server 110, a display 130, and a network 115 that allows the device 105, and the server 110 to communicate with one another.

Examples of the device 105 may include any combination of networking devices, mobile devices, smart phones, personal computing devices, computers, laptops, desktops, servers, media content set top boxes, or any combination thereof. Further examples of device 105 may include at least one of a network router, a wired router, a wireless router, network interface controller, wireless network interface controller, a modem, network bridge, network hub, network switch, a multilayer switch, a gateway, a bridge router, a firewall, a proxy server, or any combination thereof.

Examples of server 110 may include at least one of a cloud application server, a remote cloud storage server, a data server, a cloud server, a server associated with an automation service provider, proxy server, a reputation service provider, or any combination thereof.

In some configurations, the device 105 may include a user interface 135, application 140, and reputation request module 145. Although the components of the device 105 are depicted as being internal to the device 105, it is understood that one or more of the components may be external to the device 105 and connect to device 105 through wired and/or wireless connections. In some cases, application 140 may include a software application such as an online application accessed via a web browser, a cloud based application, a web based application, a mobile application configured to access the Internet, a desktop application configured to access the Internet, or any combination thereof. In some cases, application 140 may be installed on a remote device to enable a user to interface with a function of device 105, reputation request module 145, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a reputation request module 145. For example, device 105 may include application 140 that allows device 105 to interface with an external machine via reputation request module 145 located on another device. In some embodiments, server 110 may be coupled to database 120. Database 120 may be internal or external to the server 110. In one example, device 105 may be coupled directly to database 120, database 120 being internal or external to device 105.

Reputation request module 145 may enable a computing device to calculate a full thumbprint of an object on a client machine (e.g., device 105), trim one or more bits from the full thumbprint to generate a trimmed thumbprint, send the trimmed thumbprint to a reputation server (e.g., server 110), and receive a result from the reputation server regarding the trimmed thumbprint. In some embodiments, reputation request module 145 may be configured to perform the systems and methods described herein in conjunction with user interface 135 and application 140. User interface 135 may enable a user to interact with, control, and/or program one or more functions of reputation request module 145. Further details regarding the reputation request module 145 are discussed below.

Figure 2:
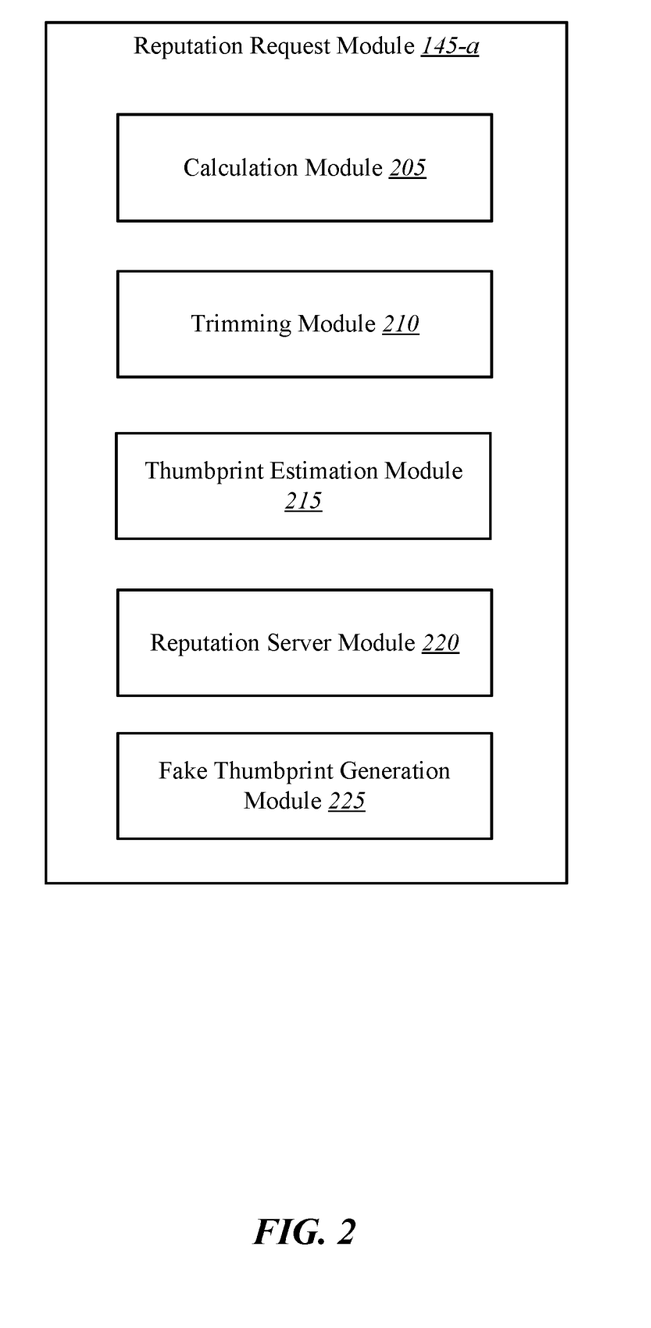
FIG. 2 is a block diagram illustrating one example of a reputation request module.

FIG. 2 is a block diagram illustrating one example of a reputation request module 145-a. Reputation request module 145-a may be one example of reputation request module 145 depicted in FIG. 1. As depicted, reputation request module 145-a may include calculation module 205, trimming module 210, thumbprint estimating module 215, reputation server module 220, and fake thumbprint generation module 225. Reputation request module 145-a may also include a receiver and a transmitter. In some cases the receiver and transmitter may be collocated into a transceiver.

In one embodiment, calculation module 205 may be configured to calculate a full thumbprint of an object or a file associated with a client machine. A "thumbprint" may also be known in the industry as a fingerprint, hash value, hash sum, or checksum, etc. In some cases, the thumbprint may be used to describe a digital output derived from a file by means of applying to the output an algorithm, such as a hash function. Thus, in some embodiments, calculating the full thumbprint may include using a hash function to generate a hash value of the object.

More specifically, a client may want to verify that a given object or file is the same version of another file (e.g., a copy), and that a given file does not include malware, or has not otherwise been manipulated. In some cases, the verification may confirm that a file is a "known-clean" file, a "known-infected" file, or a "not-known" file, and the like. In some embodiments, the thumbprint may be in the form of, but not limited to, a hexadecimal string that is generated based on a hash of information associated with a file or some other object associated with the client. If the contents of the file change (e.g., the file includes malware), the hash value associated with the file will change as well.

In order to reduce the amount of information provided by a client regarding a file, the methods and systems described herein produce a trimmed thumbprint that includes a portion of a complete hash of the file or object. For example, a simplified calculated thumbprint of a file may be represented as "1234567890ABCDEF," The number of available files in an associated database may be 16,777,216. In order to provide the client with a reasonable number of possible matches from the database, without returning 16,777,216 files, and without providing too much information regarding the file (i.e., protecting the user's privacy, protecting information regarding the reputation request, etc.), the trimming module 210 may trim a number of bits from the calculated thumbprint. Thus, in one example, the trimmed thumbprint may be "ABCDEF." In another example, the trimmed hash may be "12345." In another example, the trimmed hash may be partitions "1234" and "CDEF," etc.

Thus, in some embodiments, trimming module 210 may be enabled to trim one or more bits from the full thumbprint in order to generate a trimmed thumbprint. Trimming the one or more bits includes trimming at least one of a number of least significant bits off of the full thumbprint, trimming a number of most significant bits off of the full thumbprint, and trimming one or more middle-segment bits between the least significant bits and most significant bits, or any combination thereof. Thus, trimming bits, which may not be limited to either least or most significant, may be trimmed from the beginning of the thumbprint, the end of the thumbprint, or at any place between the beginning and end of the thumbprint (e.g., the middle). In some cases, trimming the one or more bits from the full thumbprint may be accomplished by performing integer division on the full thumbprint. In some cases, integer division may be performed on the full thumbprint with fractions dropped.

Once the thumbprint is trimmed, the reputation server module 220 is enabled to send the trimmed thumbprint to a reputation server. In other embodiments, the trimmed thumbprint to the reputation server may be sent by the transmitter or the transceiver. The reputation server module 220 may then compare the trimmed thumbprint to one or more server thumbprints stored on the reputation server. The reputation server module 220 is enabled to identify each server thumbprint for which the entire portion of the trimmed thumbprint is an exact match for a corresponding portion of a full thumbprint present on the server. In such a case, a match between the trimmed thumbprint and the full thumbprint will be returned.

For example, calculation module 205 may compute a full thumbprint for an object. As one example, calculation module 205 may compute "A23F5E3C35B32D3A3B0463-FD7AB3D376173940981" as the full thumbprint. Trimming module 210 may trim one or more bits from this full thumbprint to create a trimmed thumbprint. For example, trimming module may trim "A23F5E3C35" and "B3D376173940981" to create the trimmed thumbprint of "B32D3A3B0463FD7A." Reputation server module 220 may compare the trimmed thumbprint of "B32D3A3B0463FD7A" to one or more server thumbprints to determine whether the entirety of the trimmed thumbprint of "B32D3A3B0463FD7A" matches the corresponding portion of a server thumbprint. For example, reputation server 220 may determine that "B32D3" from the trimmed thumbprint matches "B32D3" from the server thumbprint "04DB32D39FB390C2," and/or that "A3B046" from the trimmed thumbprint matches "A3B046" from the server thumbprint "77E3DA47D823A3B046," and/or that "63FD7A" from the trimmed thumbprint matches "63FD7A" from the server thumbprint "63FD7A3D043D23B" and/or that the entire trimmed thumbprint matches the corresponding portion from the server thumbprint "E7439A2B89B32D3A3B0463FD7A-44A159DB," and so forth.

In one embodiment, the reputation server may know the method in which the client calculated the trimmed thumbprint, such that the reputation server may use the same method for trimming the full thumbprints before the comparison is made. For example, if the trimming method results in keeping the most significant 32 bits, the reputation server may trim the most significant 32 bits off of each of the thumbprints stored in the server database before comparing the full thumbprints to the trimmed thumbprint sent in the request. If the 32 bits in the trimmed thumbprint match some other person of the thumbprints present in the server database, then the trimmed thumbprint does not match any of the thumbprints present in the server database.

In some embodiments, the reputation server module 220 is enabled to receive a result from the reputation server regarding the trimmed thumbprint. The results may be a number of objects having thumbprints matching the calculated and trimmed thumbprint. In some embodiments, the thumbprint estimation module 215 may be enabled to estimate, based at least in part on a total number of server thumbprints on the reputation server and a distribution of the server thumbprints, how many matches the reputation server returns when a certain number of bits are trimmed from the full thumbprints.

Thus, in some cases, the trimming module 210 may trim N bits from the full thumbprint to enable the reputation server to return approximately M matches to the full thumbprint, where N is a positive integer (e.g., 1, 2, 3, etc.) and M is a positive integer 0 (e.g., 1, 2, 3 etc.). The number of results received may be a static amount. However, in some cases, the number of results received may be a dynamic amount. The user may configure a request to return approximately "x" number of results or "x" percent of the total number of files, to be received regardless of other variables. For example, if the client desires a reputation for an initial scan of files or objects, the number of requested reputation results may be lesser (e.g., 10,000). However, if the client desires the reputation of a specific file, the number of requested reputation results may be greater (e.g., 20,000).

In some cases, the number of results returned may be based on a user preference which is programmed into the system as an internal configuration. However, the user preferences may be changed when the software is updated or at another time. In some cases, the database may provide the client with information as to the number of total files, and the client, as a result, may select a number of desired results from the total number of files.

In some cases, the result received from the reputation server may indicate information regarding metadata associated with the file or object. In some cases, the result received may indicate encryption strength and/or an encryption type associated with the object. In some cases, the result received may indicate whether the object complies with one or more given standards. In other cases, the results received may be a score associated with the object. In some cases, the score may indicate a certain categorization of the result. For example, the score may be indicative of whether the object is "clean" or "safe" (i.e., trusted, not infected, not malware) or "infected" or "not safe" (i.e., not trusted, suspected of being or having malware, likely to be or contain malware). The score may indicate that a file is not known to be "infected," however, the score may not indicate that the reputation is definitely "clean" either. In other examples, the score may be a percentage, where the percentage indicates the probability of likelihood that the object is or is not malware. In another example, the score may be a "threat risk score," where the score is a number that falls within a predetermined range (e.g., 1-10), where the bottom of the range represents one categorization and the top of the range represents another categorization (e.g., a score of 1 may indicate a "clean" reputation, whereas a score of 10 may represent a "malware" reputation, or vice versa).

In another embodiment, the score associated with the object may categorize the object into different categories, such as "entertainment," "business," or "technology" content, etc. In other embodiments, the score may be associated with even more fine-grained attributes, such as attributes associated with specific web sites. These attributes may include, but are not limited to, the strength of encryption on the website and/or whether a website is compliant with standards, such as HIPAA or PCI standards.

In some embodiments, the result received may be information regarding a malware infection of the object. In some embodiments, the result received may indicate that when the full thumbprint matches a server thumbprint, the object is safe for the client machine. For example, the results may provide information regarding a server thumbprint that enables the client to compare the full, untrimmed thumbprint on the client to the server thumbprint received from the reputation server. The client may then determine whether the full thumbprint is a complete match to the server thumbprint. Accordingly, in some cases, the results may indicate that the server thumbprint is associated with a clean or safe object. In some cases the result received may indicate that when the full thumbprint matches another or additional server thumbprint, the object is not safe for the client machine. In addition, other classifications are contemplated which may fall within the spectrum defined by safe or not safe, known and unknown, harmful and harmless, etc. Furthermore, results received from the reputation server may include any number of classified thumbprints in any or each of the classifications (e.g., safe, not safe, known, unknown, harmful, harmless, etc.). In some cases, the result received may include additional information and/or data associated with one or more thumbprints, indicate that a file is infected or likely infected, indicate what infects the file, etc.

In some embodiments, the reputation server module 220 may receive, in the result from the reputation server, a request from the reputation server for additional information regarding the object. For example, when the result indicates that no server thumbprint matches the full thumbprint, the reputation server may request additional information regarding the object such as at least one of an object name, object size, object type, and at least a portion of the bits trimmed from the full thumbprint, or any combination thereof.

In some embodiments, fake thumbprint generation module 225 may be enabled to generate at least one fake trimmed thumbprint. In one embodiment, the generation of the at least one fake or false trimmed thumbprint reduces the chance that a third-party intercepting information from a genuine reputation request. For example, one or more fake trimmed thumbprints may be generated and sent together with a genuine trimmed thumbprint to the reputation server to obfuscate the sending of the genuine trimmed thumbprint. A third-party would then not be aware of which of the thumbprints is the genuine request versus the number of fake thumbprints, with the addition of fake thumbprints increases the security of the user.

Although a third-party interception is discussed, a fake or false trimmed thumbprint may be sent regardless if a third-party is present in the interaction or not; rather, trimming the thumbprint may prevent the reputation server itself from knowing which object for which a client is requesting reputation information.

In other embodiments, the methods and systems may trim a URL in a similar fashion as described above with respect to the file or object name or address. As opposed to a file name, a single hash may not be sufficient to identify a URL or a portion of a URL. For example, a URL may be represented as "www.abc.com." However, the same website may be associated with "www.abc.com/xyz/123." Thus, a number of trimmed thumbprints may be generated in order to obtain more detailed reputation result. In one example, a portion of the URL may be selected and a thumbprint may be generated from the portion of the URL. For example, a thumbprint may be generated by generating a hash value for the portion "www.abc.com," generating a hash value for the portion "abc.com," generating a hash value for the portion "abc.com/xyz," a thumbprint may be generated from the portion "/xyz," generating a hash value for the portion "xyz/123," or any combination thereof. In some embodiments, a trimmed thumbprint may be a combination of two or more other trimmed thumbprints.

In some embodiments, domain components are trimmed from a host portion of a URL (e.g., starting at the left of the URL). In other embodiments, file components are trimmed from a path portion of the URL (e.g., starting at the right of the URL); however, at least one host component may be left in the name, and in some cases multiple components may remain. In yet other embodiments, domain components and file components are trimmed from the same URL.

When the trimmed thumbprint(s) of the URL is sent to the reputation server, the server may return a result for each thumbprint sent to the reputation server. For example, the reputation server may provide results for each portion of the URL (e.g., "www.abc.com," "abc.com," "abc.com/xyz," etc.). The reputation determination is then enabled similarly to that described above with respect a file or object thumbprint matching.

Figure 3:
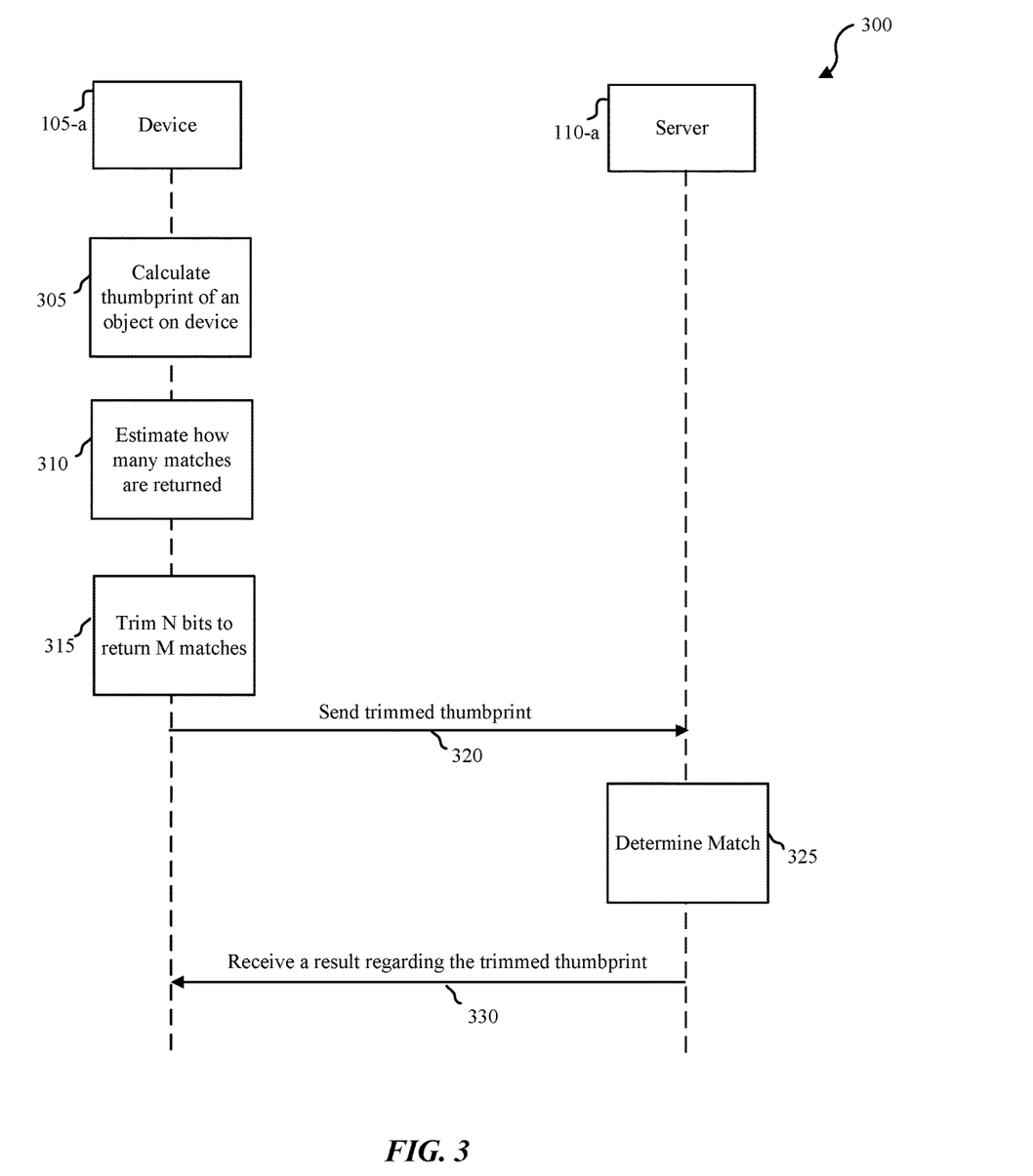
FIG. 3 shows a block diagram of a data flow in accordance with various aspects of this disclosure.

FIG. 3 shows a block diagram of a data flow 300 in accordance with various aspects of this disclosure. In some configurations, the data flow 300 may be implemented in conjunction with the reputation request module 145 illustrated in FIGS. 1 and/or 2. In some configurations, the data flow 300 may be implemented in conjunction with device 105-a, server 110-a (e.g., reputation server), network 115, database 120, components thereof, or any combination thereof. Device 105-a and server 110-a may be examples of device 105 and server 110 of FIG. 1, respectively.

As depicted, at block 305, the device 105-a may calculate a thumbprint associated with the contents of an object, such as a file. At block 310, the device 105-a may estimate how many matches may be returned by the reputation server 110-a. Once the device 105-a has estimated the number of matches that may be returned from the reputation server, the device 105-a may make a determination to trim N number of bits from the calculated thumbprint in order for the reputation server 110-a to return a desired M number of matches (shown in block 315). The device 105-a may apply an algorithm to the thumbprint to create a trimmed thumbprint which may be used to identify the object. The algorithm may trim a number of bits from the thumbprint, including bits from at least one of the beginning, the end, and the middle of the thumbprint, or any combination thereof.

At step 320, the device 105-a may transmit the trimmed thumbprint associated with the object to server 110-a. In some cases, the server may be a reputation server associated with a database storing multiple objects.

At block 325, the reputation server 110-a may determine which among the multiple stored objects has a thumbprint that may match the trimmed thumbprint transmitted from device 105-a. At step 330, the reputation server 110-a may transmit a result to the device 105-a regarding the determination as to whether there were any thumbprint matches to the trimmed thumbprint. In some cases, the result is a range of thumbprints, the range potentially containing a match to the thumbprint. In other cases, the result is a number of matches returned determined by a user or by the client device. In some cases, the result is determined by the server.

Figure 4:
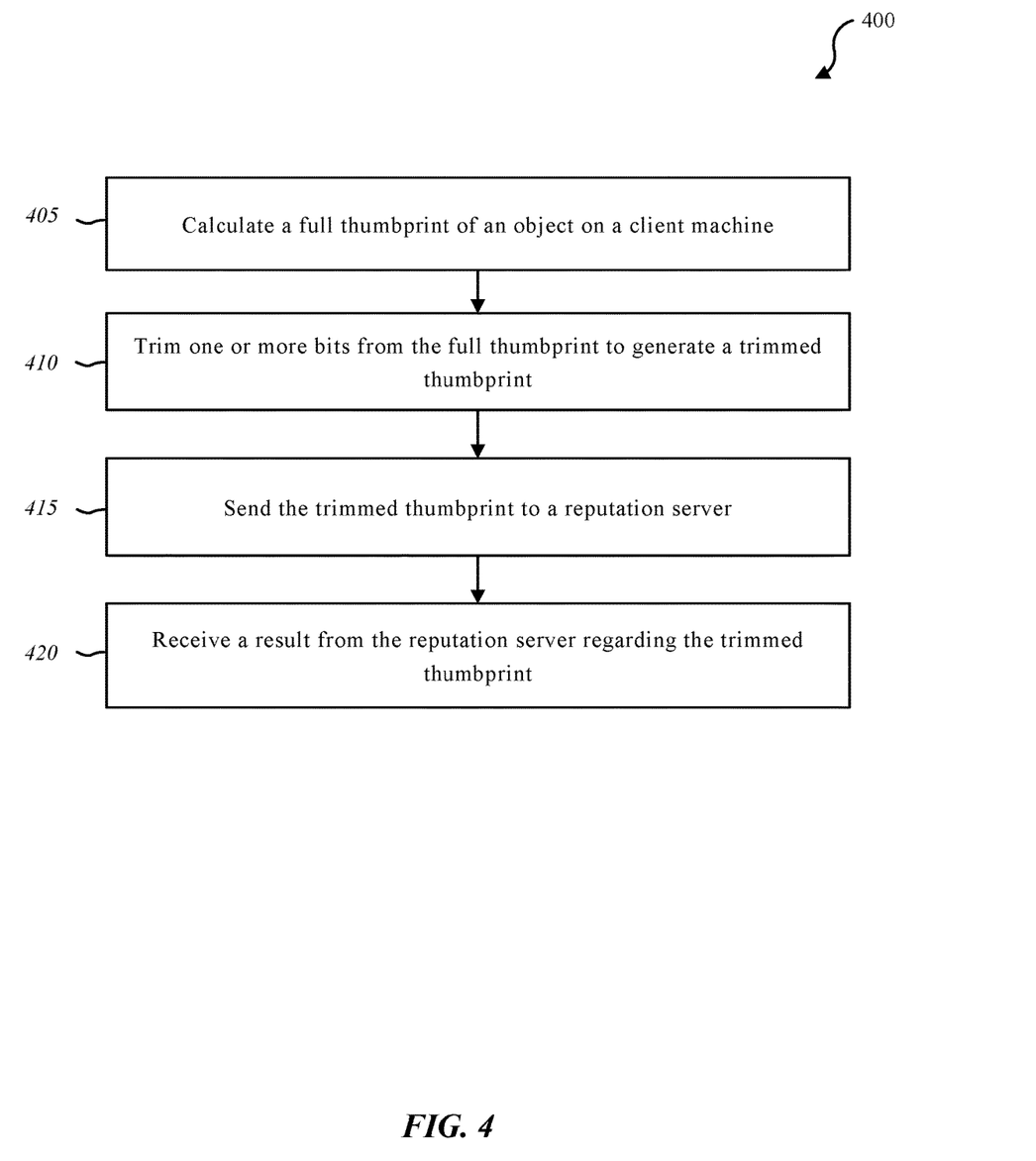
FIG. 4 is a flow diagram illustrating one embodiment of a method in accordance with various aspects of this disclosure.

FIG. 4 is a flow diagram illustrating one embodiment of a method 400 for anonymous reputation requests. In some configurations, the method 400 may be implemented by the reputation request module 145 illustrated in FIGS. 1 and 2. In some configurations, the method 400 may be implemented in conjunction with device 105, server 110, network 115, database 120, components thereof, or any combination thereof.

At block 405, method 400 may include calculating a full thumbprint of an object on a client machine. At block 410, the method 400 may include trimming one or more bits from the full thumbprint to generate a trimmed thumbprint. At block 415, the method 400 may include sending the trimmed thumbprint to a reputation server. At block 420, the method 400 may include receiving a result from the reputation server regarding the trimmed thumbprint.

Figure 5:
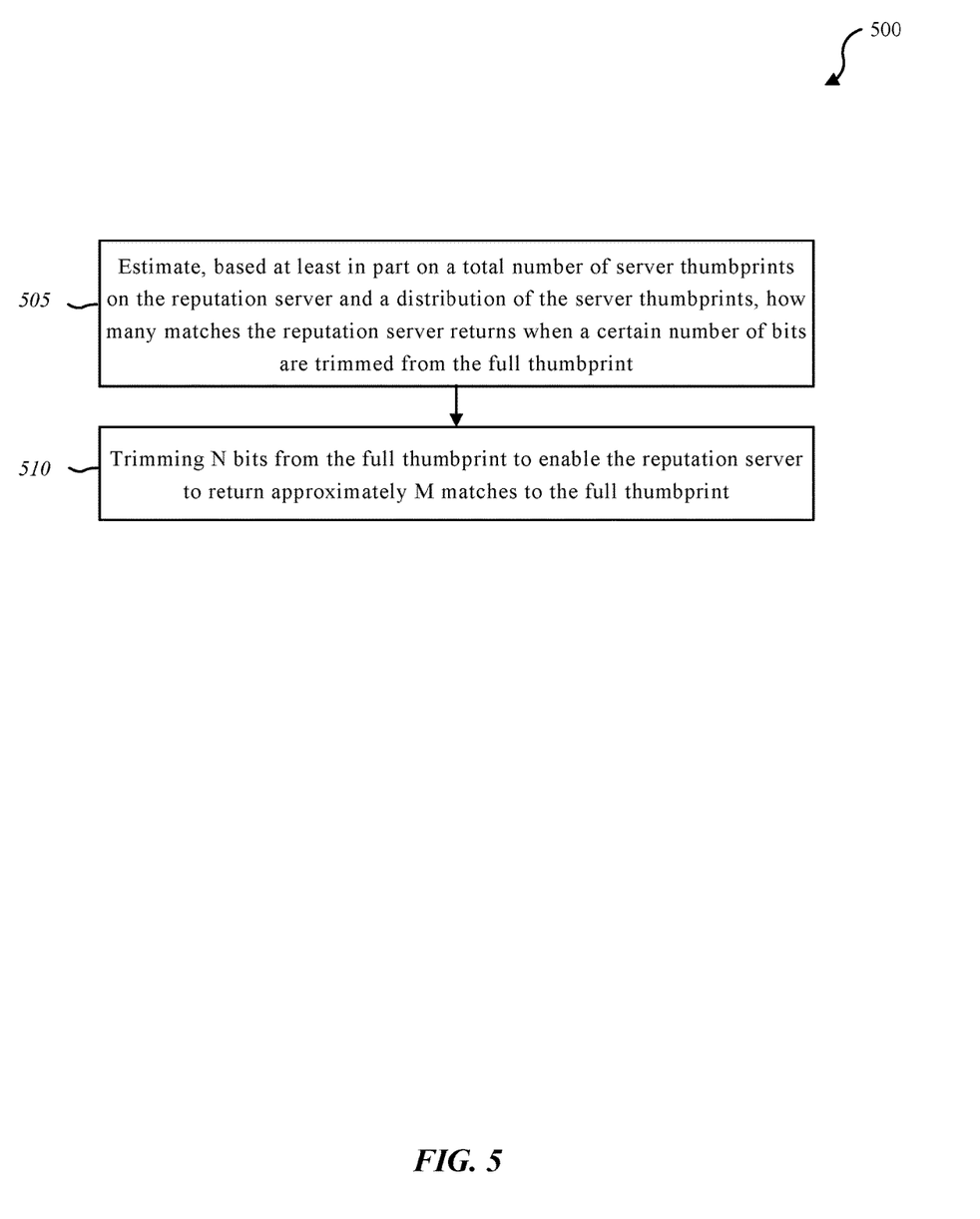
FIG. 5 is a flow diagram illustrating one embodiment of a method in accordance with various aspects of this disclosure.

FIG. 5 is a flow diagram illustrating one embodiment of a method 500 for anonymous reputation requests. In some configurations, the method 500 may be implemented by the reputation request module 145 illustrated in FIGS. 1 and 2. In some configurations, the method 500 may be implemented in conjunction with device 105, server 110, network 115, database 120, components thereof, or any combination thereof.

At block 505, method 500 may include estimating, based at least in part on a total number of server thumbprints on the reputation server and a distribution of the server thumbprints, how many matches the reputation server returns when a certain number of bits are trimmed from the full thumbprint. At block 510, method 500 may include trimming N bits from the full thumbprint to enable the reputation server to return approximately M matches to the full thumbprint.

Figure 6:
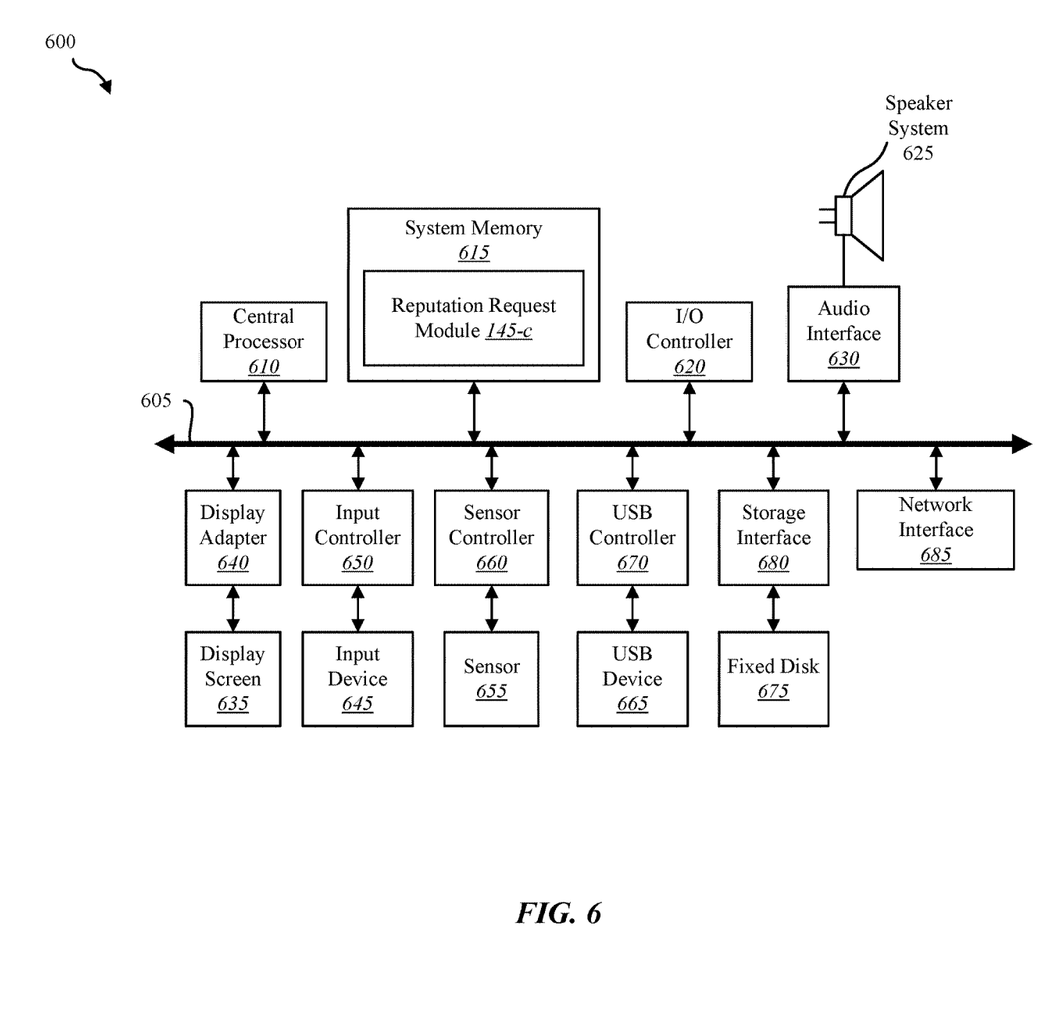
FIG. 6 depicts a block diagram of a computer system suitable for implementing the present systems and methods.

FIG. 6 depicts a block diagram of a computing device 600 suitable for implementing the present systems and methods. The device 600 may be an example of device 105 and/or server 110 illustrated in FIG. 1. In one configuration, device 600 includes a bus 605 which interconnects major subsystems of device 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the reputation request module 145-c to implement the present systems and methods may be stored within the system memory 615. Applications (e.g., application 140) resident with device 600 are generally stored on and accessed via a non-transitory computer readable medium, such as a hard disk drive (e.g., fixed disk 675) or other storage medium. Additionally, applications can be in the form of electronic signals modulated in accordance with the application and data communication technology when accessed via interface 685.

Storage interface 680, as with the other storage interfaces of device 600, can connect to a standard computer readable medium for storage and/or retrieval of information, such as a fixed disk drive 675. Fixed disk drive 675 may be a part of device 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 600 wirelessly via network interface 685.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on device 600 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 600 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 585 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 620 may operate in conjunction with network interface 685 and/or storage interface 680. The network interface 685 may enable system 600 with the ability to communicate with client devices (e.g., device 105 of FIG. 1), and/or other devices over the network 115 of FIG. 1. Network interface 685 may provide wired and/or wireless network connections. In some cases, network interface 685 may include an Ethernet adapter or Fiber Channel adapter. Storage interface 680 may enable system 600 to access one or more data storage devices. The one or more data storage devices may include two or more data tiers each. The storage interface 680 may include one or more of an Ethernet adapter, a Fiber Channel adapter, Fiber Channel Protocol (FCP) adapter, a SCSI adapter, and iSCSI protocol adapter.

Figure 7:
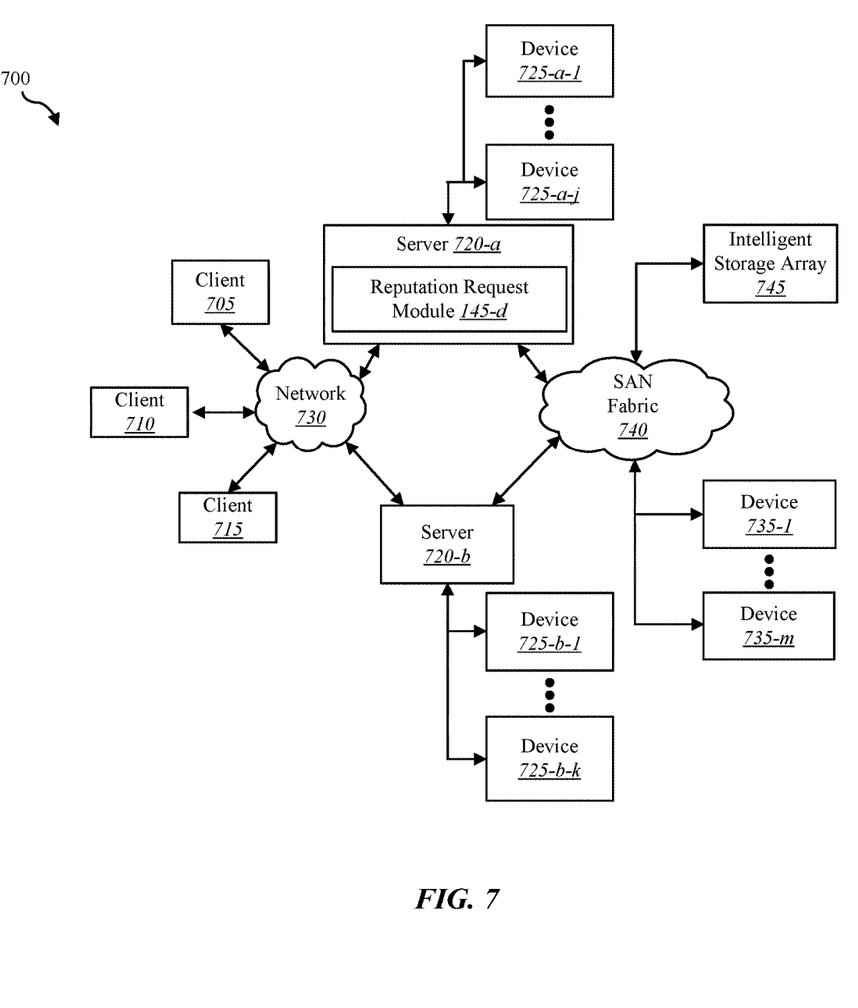
FIG. 7 depicts a block diagram of a computer system suitable for implementing the present systems and methods.

FIG. 7 is a block diagram depicting a network architecture 700 in which client systems 705, 710 and 715, as well as storage servers 720-a and 720-b (any of which can be implemented using computer system 600), are coupled to a network 730. In one embodiment, reputation request module 145-d may be located within one of the storage servers 720-a, 720-b to implement the present systems and methods. Reputation request module 145-d may be one example of reputation request modules 145 depicted in FIGS. 1, 2, and/or 5. The storage server 720-a is further depicted as having storage devices 725-a-1 through 725-a-j directly attached, and storage server 720-b is depicted with storage devices 725-b-1 through 725-b-k directly attached. SAN fabric 740 supports access to storage devices 735-1 through 735-m by storage servers 720-a and 720-b, and so by client systems 705, 710 and 715 via network 730. Intelligent storage array 745 is also shown as an example of a specific storage device accessible via SAN fabric 740.

With reference to computer system 700, network interface 785 or some other method can be used to provide connectivity from each of client computer systems 705, 710 and 715 to network 730. Client systems 705, 710 and 715 are able to access information on storage server 620-a or 620-b using, for example, a web browser or other client software (not shown). Such a client allows client systems 705, 710 and 715 to access data hosted by storage server 720-a or 720-b or one of storage devices 725-a-1 to 725-a-j, 725-b-1 to 725-b-k, 735-1 to 735-m or intelligent storage array 745. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining a packet injection. For example, types of security actions may include preventing the packet from performing any actions on the computing device, alerting an administrator to the potential maliciousness of the connection, quarantine a file related to the connection, delete the file, block a download of the file, and/or warn a user about the connection. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method to improve customer privacy in computer security comprising:
   calculating a full thumbprint of an object on a client machine;
   trimming one or more bits from the full thumbprint to generate a trimmed thumbprint;
   sending the trimmed thumbprint to a reputation server; and
   receiving a result from the reputation server regarding the trimmed thumbprint, the result indicating each server thumbprint of which a portion of each server thumbprint matches at least a portion of the trimmed thumbprint.

2. The method of claim 1, wherein the trimming of the one or more bits comprises at least one of trimming one or more least significant bits off the full thumbprint, trimming one or more most significant bits off the full thumbprint, trimming one or more middle segment bits off the full thumbprint, and performing integer division with fractions dropped on the full thumbprint, or any combination thereof.

3. The method of claim 1, wherein the object includes at least one of a file on the client machine, a file address of the file, and a uniform resource locator (URL) entered in a web browser of the client machine, or any combination thereof.

4. The method of claim 1, wherein calculating the full thumbprint includes using a hash function to generate a hash value of the object.

5. The method of claim 1, further comprising:
   estimating, based at least in part on a total number of server thumbprints on the reputation server and a distribution of the server thumbprints, how many matches the reputation server returns when a certain number of bits are trimmed from the full thumbprint.

6. The method of claim 5, further comprising:
   trimming N bits from the full thumbprint to enable the reputation server to return approximately M matches to the full thumbprint.

7. The method of claim 1, further comprising:
   generating a fake trimmed thumbprint and sending the fake trimmed thumbprint to the reputation server to obfuscate the sending of the trimmed thumbprint to the reputation server.

8. The method of claim 1, wherein the reputation server compares the trimmed thumbprint to one or more server thumbprints on the reputation server, identifies each server thumbprint of which a portion of each server thumbprint matches at least a portion of the trimmed thumbprint, and transmits to the client machine an indication of each server thumbprint that matches at least a portion of the trimmed thumbprint.

9. The method of claim 8, wherein the result from the reputation server indicates at least one of information regarding metadata associated with the object, one or more categories associated with content of the object, one or more attributes of the object, an indication of encryption strength and/or encryption type associated with the object, an indication of whether the object complies with one or more given standards, a threat risk score associated with the object, information regarding a malware infection of the object, that when the full thumbprint matches a first server thumbprint the object is safe for the client machine, and that when the full thumbprint matches a second server thumbprint the object is not safe for the client machine, or any combination thereof.

10. The method of claim 8, further comprising:
    receiving, in the result from the reputation server, a request from the reputation server for additional information regarding the object when no server thumbprint matches the trimmed thumbprint, wherein the additional information includes at least one of object name, object size, object type, and at least a portion of the bits trimmed from the thumbprint, or any combination thereof.

11. A computing device for improving computer privacy in computer security, comprising:
one or more processors;
memory in electronic communication with the one or more processors, wherein the memory stores computer executable instructions that when executed by the one or more processors cause the one or more processors to perform the steps of:
calculating a full thumbprint of an object on a client machine;
trimming one or more bits from the full thumbprint to generate a trimmed thumbprint;
sending the trimmed thumbprint to a reputation server; and
receiving a result from the reputation server regarding the trimmed thumbprint, the result indicating each server thumbprint of which a portion of each server thumbprint matches at least a portion of the trimmed thumbprint.

12. The computing device of claim 11, wherein trimming of the one or more bits comprises at least one of trimming one or more least significant bits off the full thumbprint, trimming one or more most significant bits off the full thumbprint, trimming one or more middle segment bits off the full thumbprint, and performing integer division with fractions dropped on the full thumbprint, or any combination thereof.

13. The computing device of claim 11, wherein the object includes at least one of a file on the client machine, a file address of the file, and a uniform resource locator (URL) entered in a web browser of the client machine, or any combination thereof.

14. The computing device of claim 11, wherein when the processor calculates the full thumbprint, the instructions further cause the processor to calculate the full thumbprint using a hash function to generate a hash value of the object.

15. The computing device of claim 11, wherein the instructions executed by the one or more processors cause the one or more processors to further perform the step of:
estimating, based at least in part on a total number of server thumbprints on the reputation server and a distribution of the server thumbprints, how many matches the reputation server returns when a certain number of bits are trimmed from the full thumbprint.

16. The computing device of claim 15, wherein the instructions executed by the one or more processors cause the one or more processors to further perform the step of:
trimming N bits from the full thumbprint to enable the reputation server to return approximately M matches to the full thumbprint.

17. The computing device of claim 11, wherein the instructions executed by the one or more processors cause the one or more processors to further perform the step of:
generating a fake trimmed thumbprint and sending the fake trimmed thumbprint to the reputation server to obfuscate the sending of the trimmed thumbprint to the reputation server.

18. The computing device of claim 1, wherein the instructions executed by the one or more processors cause the one or more processors to further perform the step of:
comparing the trimmed thumbprint to one or more server thumbprints on the reputation server, identifies each server thumbprint of which a portion of each server thumbprint matches the trimmed thumbprint, and transmits to the client machine an indication of each server thumbprint that matches at least a portion of the trimmed thumbprint.

19. A non-transitory computer-readable storage medium storing computer executable instructions that when executed by one or more processors cause the one or more processors to perform the steps of:
calculating a full thumbprint of an object on a client machine;
trimming one or more bits from the full thumbprint to generate a trimmed thumbprint;
sending the trimmed thumbprint to a reputation server; and
receiving a result from the reputation server regarding the trimmed thumbprint, the result indicating each server thumbprint of which a portion of each server thumbprint matches at least a portion of the trimmed thumbprint.

20. The non-transitory computer-readable storage medium of claim 11, wherein trimming of the one or more bits comprises at least one of trimming one or more least significant bits off the full thumbprint, trimming one or more most significant bits off the full thumbprint, trimming one or more middle segment bits off the full thumbprint, and performing integer division with fractions dropped on the full thumbprint, or any combination thereof.

* * * * *